United States Patent
Nako

(10) Patent No.: US 7,373,015 B2
(45) Date of Patent: May 13, 2008

(54) IMAGE PROCESSING DEVICE AND METHOD

(75) Inventor: Kazuyuki Nako, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 628 days.

(21) Appl. No.: 10/149,486

(22) PCT Filed: Dec. 11, 2000

(86) PCT No.: PCT/JP00/08772

§ 371 (c)(1),
(2), (4) Date: Oct. 15, 2002

(87) PCT Pub. No.: WO01/45041

PCT Pub. Date: Jun. 21, 2001

(65) Prior Publication Data

US 2003/0118247 A1    Jun. 26, 2003

(30) Foreign Application Priority Data

Dec. 15, 1999 (JP) .................................. 11/355627

(51) Int. Cl.
*G06K 9/40* (2006.01)
(52) U.S. Cl. ............... 382/275; 382/260; 382/274; 382/275; 382/282; 358/3.26; 358/3.27; 358/463
(58) Field of Classification Search .......... 382/260, 382/266, 274, 275, 282, 294, 298; 385/3.26, 385/3.27, 463, 1.2
See application file for complete search history.

(56) References Cited

U.S. PATENT DOCUMENTS

| | | | |
|---|---|---|---|
| 4,969,051 A * | 11/1990 | Sasaki | 358/447 |
| 5,121,445 A * | 6/1992 | Tsujiuchi et al. | 382/280 |
| 5,173,788 A * | 12/1992 | Ohta | 382/264 |
| 5,225,915 A * | 7/1993 | Ciccone et al. | 358/447 |
| 5,513,016 A | 4/1996 | Inoue | 358/456 |
| 5,526,446 A * | 6/1996 | Adelson et al. | 382/275 |
| 5,541,740 A * | 7/1996 | Mori | 358/447 |
| 5,649,031 A * | 7/1997 | Nakamura et al. | 382/254 |
| 5,821,915 A * | 10/1998 | Graham et al. | 345/615 |

(Continued)

FOREIGN PATENT DOCUMENTS

JP    62-088478    4/1987

(Continued)

*Primary Examiner*—Yosef Kassa
(74) *Attorney, Agent, or Firm*—George W. Neuner; David G. Conlin; Edwards Angell Palmer & Dodge, LLP

(57) ABSTRACT

In an image processing method for reducing an input image while preventing moire without deterioration of image quality, presence/absence of periodicity is detected for each pixel on the input image, and if there is periodicity, an image period is detected (S4). Sample points are sequentially extracted from the input image at prescribed sampling intervals (S5). A value is obtained by multiplying the image period by n (n is a natural number) that exceeds the sampling interval, to set a smoothing area. Pixels around a sample point is smoothed in the set smoothing area. The pixel value for a reduced image is obtained (S6). If there is an unprocessed sample point (NO at S8), the step goes back to S6, and the next sample point is subjected to a similar process. If the process is terminated for all the sample points (YES at S8), the reduced image is output.

18 Claims, 10 Drawing Sheets

U.S. PATENT DOCUMENTS

| | | | |
|---|---|---|---|
| 5,881,176 A * | 3/1999 | Keith et al. | 382/248 |
| 5,909,518 A * | 6/1999 | Chui | 382/277 |
| 5,936,552 A * | 8/1999 | Wichgers et al. | 340/963 |
| 6,094,018 A * | 7/2000 | Fujimori et al. | 315/370 |
| 6,100,929 A * | 8/2000 | Ikeda et al. | 348/262 |
| 6,108,036 A * | 8/2000 | Harada et al. | 348/219.1 |
| 6,215,895 B1 * | 4/2001 | Sali et al. | 382/141 |
| 6,226,397 B1 * | 5/2001 | Yamagata et al. | 382/162 |
| 6,333,986 B1 * | 12/2001 | Petty | 382/103 |
| 6,362,802 B1 * | 3/2002 | Fujiwara et al. | 345/87 |
| 6,459,816 B2 * | 10/2002 | Matsuura et al. | 382/248 |
| 7,064,862 B2 * | 6/2006 | Takashimizu | 358/1.9 |

FOREIGN PATENT DOCUMENTS

| | | |
|---|---|---|
| JP | 62-088479 | 4/1987 |
| JP | 62-256573 | 11/1987 |
| JP | 02-193461 | 7/1990 |
| JP | 04-156179 | 5/1992 |
| JP | 04-180353 | 6/1992 |
| JP | 04180353 A | 6/1992 |
| JP | 11-017966 | 1/1999 |
| JP | 11-088609 | 3/1999 |
| JP | 2000-022939 | 1/2000 |

* cited by examiner

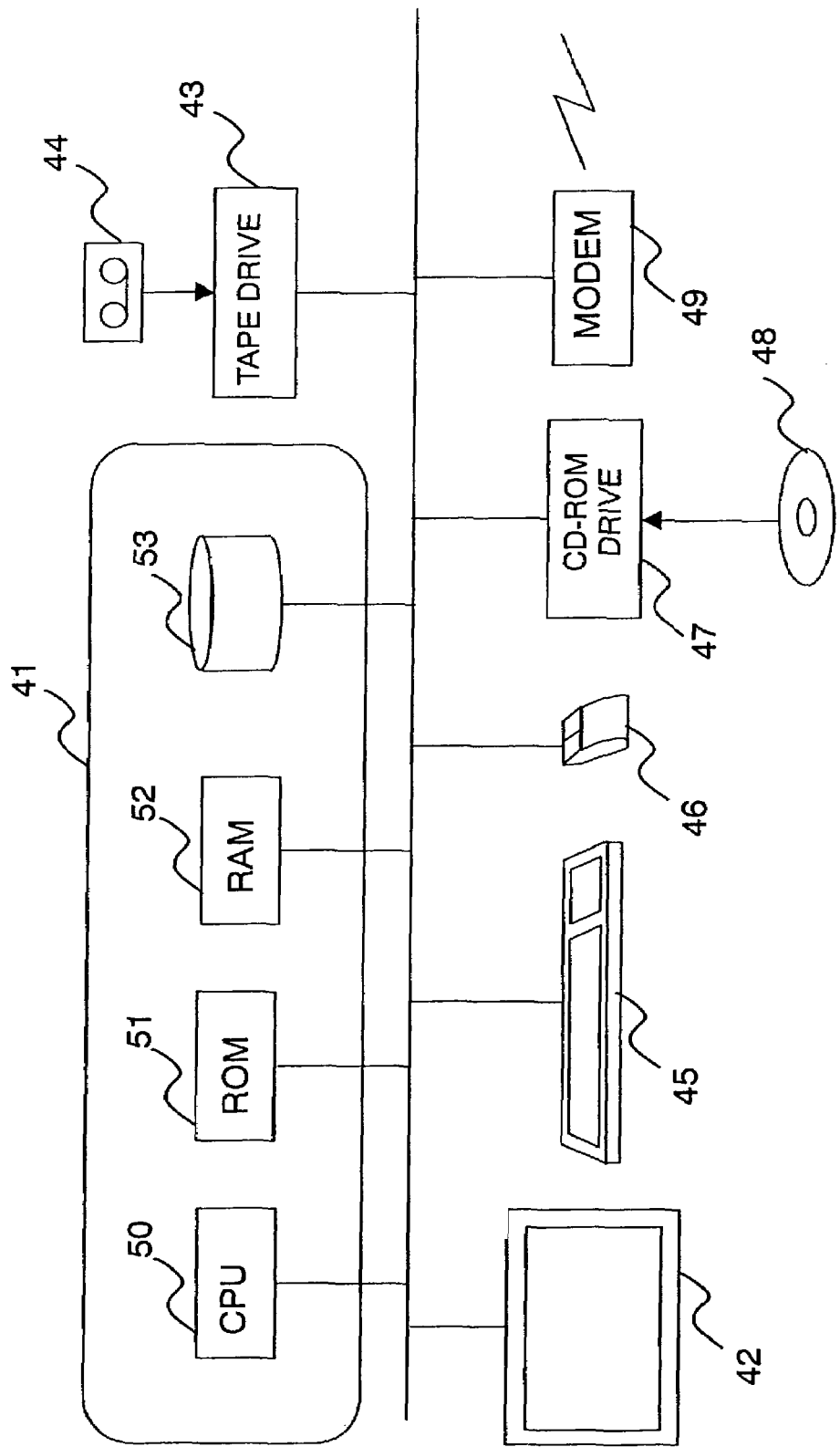

IMAGE PROCESSING DEVICE AND METHOD

TECHNICAL FIELD

The present invention relates to an image processing device and method, and more particularly, to an image processing device and method for setting the size of a filter based on periodicity included in an image, to reduce the image.

BACKGROUND ART

Conventionally, in an image processing device, an input image is generally reduced at a prescribed ratio to create a reduced image. The reduced image is created by smoothing the input image while extracting pixels at prescribed sampling intervals.

However, when the image has periodicity which is inconsistent with the sampling intervals, moire occurs. The occurrence of moire is particularly significant at a dot portion such as Screen-tone. This is because the number of dots included in an area to be smoothed changes with periods dependent to the sampling intervals and the image periods, and a pixel value after smoothing also varies with periodicity, for each sample point.

In order to eliminate such moire occurring at the dot portion, a method is provided for detecting dots in advance and smoothing the dot portion across an area of a certain size. However, there are many different types of image periods of dots, and a relatively large area must be smoothed in order to eliminate occurrence of the moire at dot portions of all types, resulting in deterioration of image quality.

Moreover, random dots that have no periodicity may also be subjected to a similar smoothing process, which is unnecessary, causing further deterioration of the image quality.

DISCLOSURE OF THE INVENTION

The present invention was made to solve the problems described above, and an object of the invention is to provide an image processing device and method for reducing an input image while preventing occurrence of moire, without any deterioration of image quality.

According to an aspect of the present invention, an image processing device includes an image period detecting means for detecting an image period in an input image, and an image reducing means connected to the image period detecting means, for reducing the input image by filtering pixels in an area according to an output of the image period detecting means.

A smoothing area is set in accordance with the image period, to create a reduced image. Thus, even if pixels with periodicity such as a dot portion may be smoothed to create a reduced image, the reduced image with suppressed moire can be obtained without deterioration of image quality.

Preferably, the image period detecting means includes a region detecting means for detecting a region having a size within a prescribed range in an input image, and a region interval image period detecting means connected to the region detecting means, for detecting an image period based on an interval between the regions.

More preferably, the region interval image period detecting means includes a distribution determining means connected to the region detecting means, for determining, for each region detected by the region detecting means, whether or not at least a prescribed number of the regions are distributed at regular intervals within a prescribed area near the detected region, and an image period setting means connected to the distribution determining means, for setting, when at least prescribed number of the regions are distributed at regular intervals, the interval in the case of horizontal or vertical distribution, and 2.5 times the interval in the case of 45-degree distribution, as an image period for pixels within a prescribed region including a target region, and for determining, otherwise, that the pixels within the prescribed region including the target region have no periodicity.

More preferably, the region interval image period detecting means further includes a means connected to the image period setting means, for determining that the pixels within the prescribed region including the target region has no periodicity when the image period is greater than the prescribed sampling interval by a certain ratio.

More preferably, the image reducing means reduces an input image by different methods for pixels with and without periodicity.

More preferably, the image processing device further includes an edge enhancement means connected to the image reducing means, for performing an edge enhancement process for pixels in a reduced image corresponding to pixels determined to have no periodicity in an input image.

After the reduced image is created, the edge enhancement process is performed for a portion with no periodicity. This can sharpen a blur which may occur at the dot portion or the like by averaging the pixel values.

More preferably, the image reducing means selects pixels in an input image at prescribed sampling intervals, finds a value of an integer multiple or a half of an image period greater than the prescribed sampling interval, for each of the selected pixels, and filters pixels around the selected pixels based on a filter having a size of the found value, to reduce the input image.

The smoothing area may be set to include therein regions each having the same number of pixels and the size within a prescribed range. This approximately equalizes the pixel value of each pixel when the portion with periodicity is reduced. Therefore, a reduced image with suppressed moire can be obtained without deterioration of image quality.

More preferably, the image reducing means selects pixels in an input image at prescribed sampling intervals, and filters, when the selected pixels have no periodicity, pixels around the selected pixels based on a filter having a size of the prescribed sampling interval.

According to another aspect of the present invention, an image processing method is used in an image processing device including an image period detecting means for detecting an image period in an input image, and an image reducing means connected to the image period detecting means, for reducing the input image by filtering pixels in an area according to an output of the image period detecting means, including the steps of detecting a local image period in the input image, selecting pixels in the input image at prescribed sampling intervals, and reducing the input image by filtering, for each of the selected pixels, pixels in the area according to the image period on the periphery of the pixel.

A smoothing area is set in accordance with the image period, to create a reduced image. Thus, even if pixels with periodicity such as a dot portion may be smoothed to create a reduced image, the reduced image with suppressed moire can be obtained without deterioration of image quality.

BEST MODES FOR CARRYING OUT THE INVENTION

First Embodiment

Figure 1:
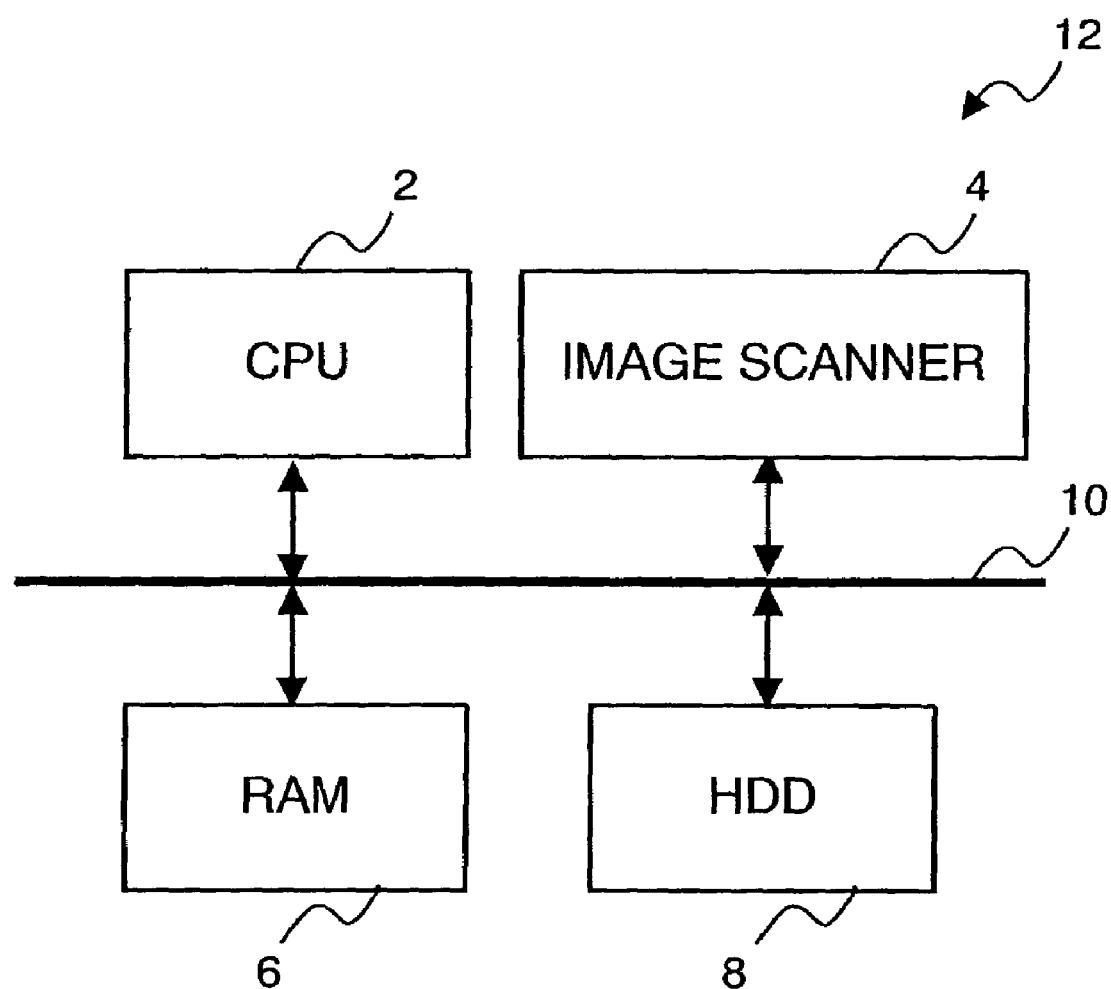
FIG. 1 shows a hardware configuration of an image processing device according to the first and second embodiments.

Referring to FIG. 1, an image processing device 12 according to the first embodiment of the present invention includes an image sensor 4 constituted by a scanner or the like for entering an image; an HDD (Hard Disk Device) 8 storing an input image entered by image scanner 4, a reduced image which will be described later, and an image processing program; a memory 6 storing the image processing program, an image being processed and the like; a CPU (Central Processing Unit) 2 executing an image reducing process, which will be described later, according to the image processing program stored in memory 6; and a bus 10 interconnecting CPU 2, image scanner 4, memory 6 and HDD 8.

Figure 2:
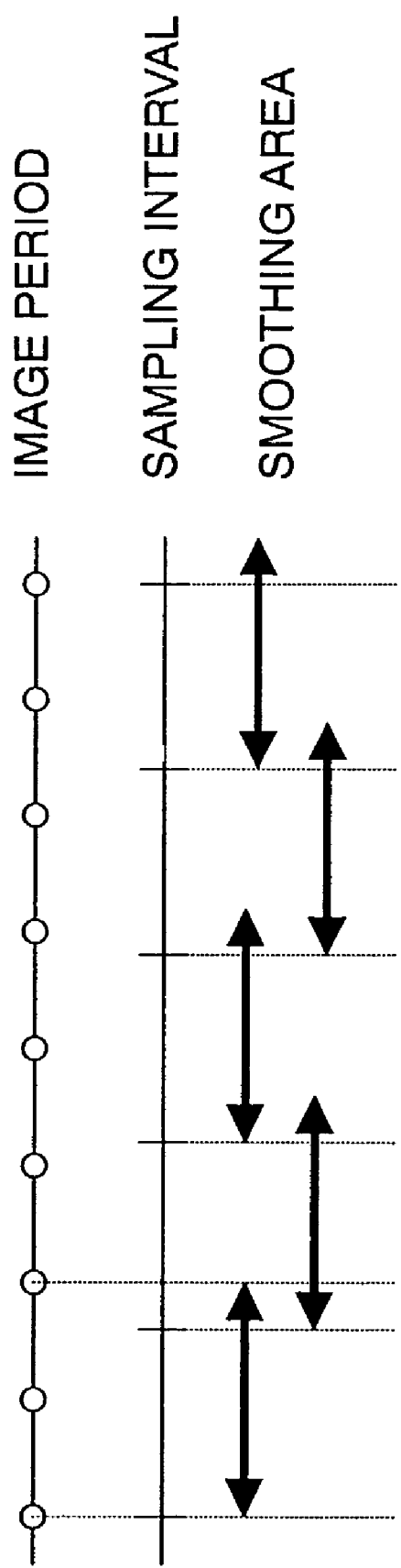
FIG. 2 illustrates the relation between an image period and a sampling interval.

Referring to FIG. 2, an outline of a process performed by image processing device 12 is described. Image processing device 12 smoothes an input image while sampling the image at prescribed sampling intervals, to create a reduced image. Here, an area to be smoothed is set as follows. It is noted that FIG. 2 shows a one-dimensional example for simplicity. The smallest n is found at which a value obtained by multiplying the period of dots (hereinafter referred to as "image period") by n (n is a natural number or 0.5) exceeds a sampling interval, and (image period×n) is set as a smoothing area. By thus setting the smoothing area, the number of dots included in the smoothing area at each sampling point may be made constant. For example, in FIG. 2, a smoothing area always includes two dots. Therefore, when smoothing is performed, variations in the pixel value for each sample point can be eliminated, preventing occurrence of moire. If n is 0.5, though the pixel value after smoothing defers for each sample point, occurrence of moire can still be suppressed, since the smoothing area includes 0.5 dots on average.

Figure 3:
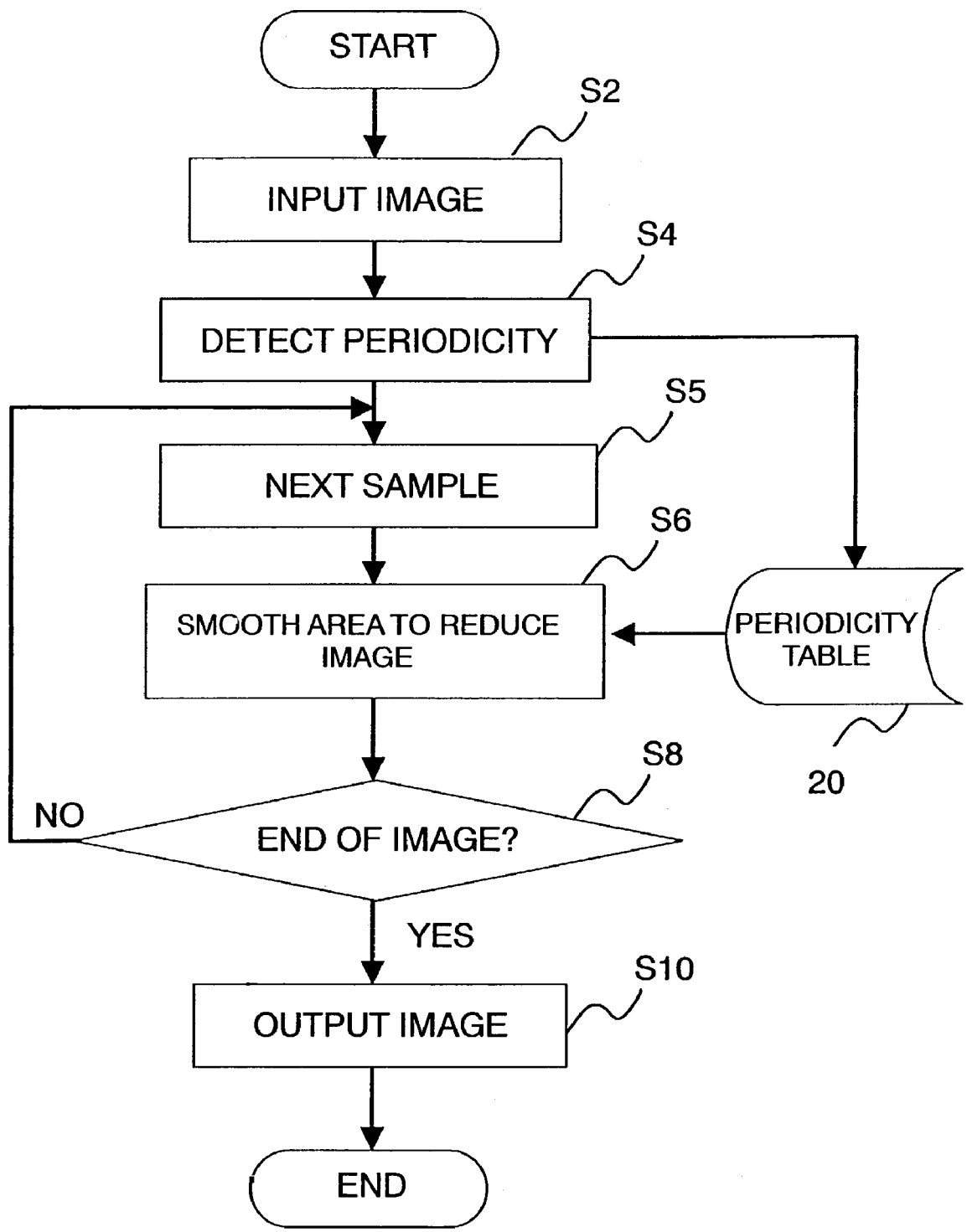
FIG. 3 is a flow chart showing an image reducing process according to the first embodiment.
Figure 4:
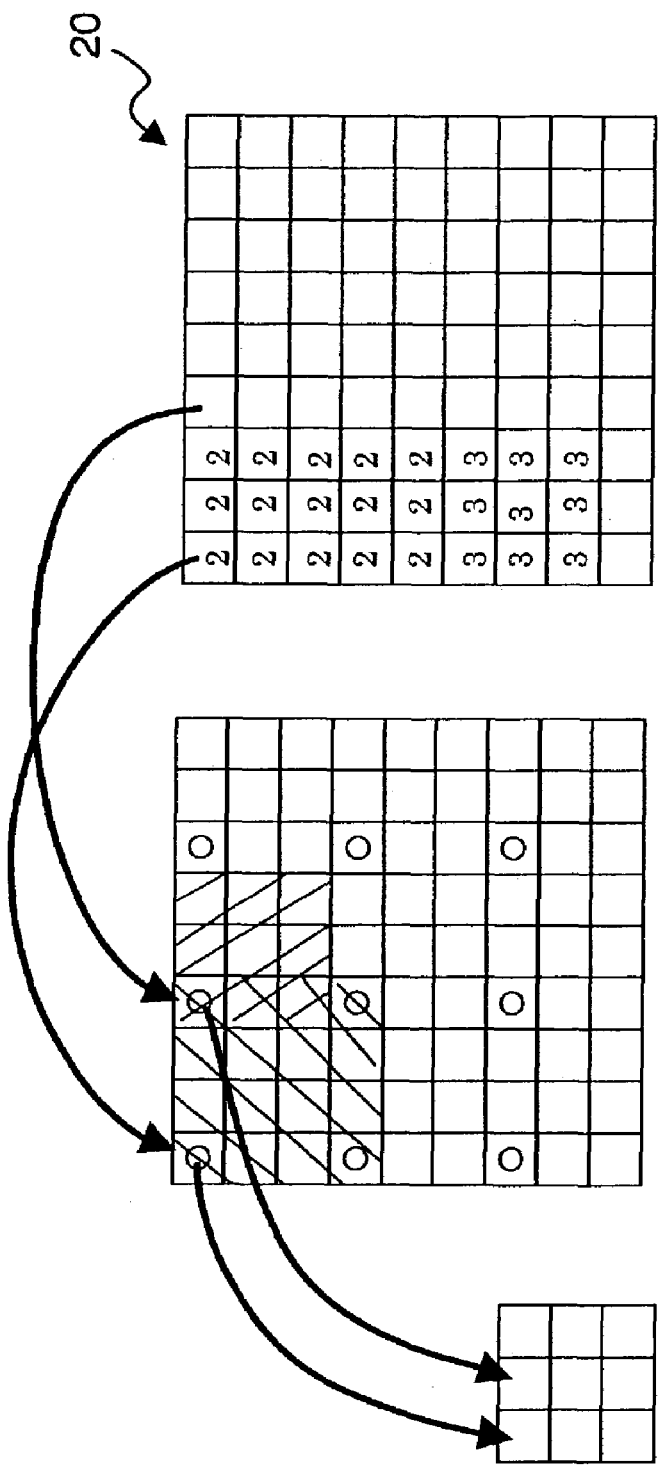
FIG. 4 illustrates the relation of a periodicity table, an input image and a reduced image.

Referring to FIG. 3, the image reducing process performed by image processing device 12 is described in detail. An image is input from image scanner 4 or HDD 8 into memory 6 (S2). Presence/absence of periodicity is detected for each pixel of the input image, and if there is periodicity, an image period is detected (S4). The periodicity is stored into a periodicity table 20 having the same size as that of the input image, as shown in FIG. 4. Periodicity table 20 is stored in memory 6. The process at S4 will be described later in detail.

CPU 2 sequentially extracts sample points from the input image at prescribed sampling intervals (S5). For example, in FIG. 4, sample points are extracted at every three pixels.

CPU 2 examines the image period for each sample point with reference to periodicity table 20, to find a value obtained by multiplying an image period by n (n is a natural number or 0.5) that exceeds the sampling interval. It is noted that, if a sample point has no periodicity, the sampling interval is set as a smoothing area. In the set smoothing area, pixels around the sample point are smoothed to find the pixel value of a reduced image (S6). For example, in FIG. 4, the image period of the sample point at the upper left corner of the input image is set as 2. Further, the sampling interval is 3. Thus, the smoothing area is obtained by doubling the image cycle (=4). Therefore, an average value of pixels around the sample point is found using a smoothing filter of the size of 4×4, and the average value is set as the pixel value of the reduced image. Since an adjacent sample point on the right side of the above-described sample point has no periodicity, the smoothing area is set as 3, which is equal to the sampling interval, and the average value of the pixels around the sample point is obtained using a smoothing filter having the size of 3×3.

CPU 2 determines whether or not the process of determining the pixel value of the reduced image has been performed for all the sample points (S8). If there is an unprocessed sample point (NO at S8), the process goes back to S6, and a similar process is performed for the next sample point.

If the process is terminated for all the sample points (YES at S8), the reduced image is output to HDD 8.

Figure 5:
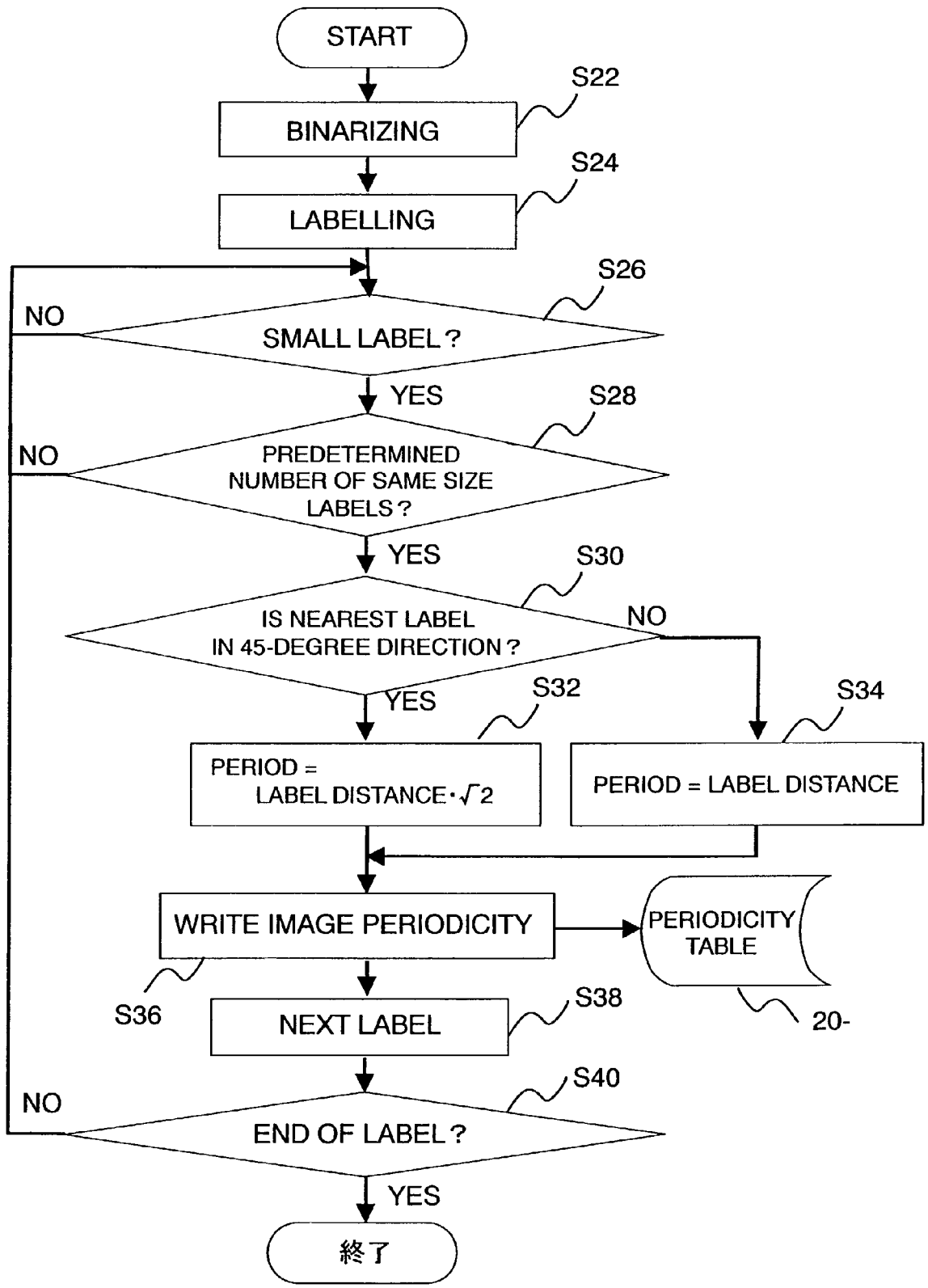
FIG. 5 is a flow chart showing a process of detecting presence/absence of periodicity and detecting a period.

Referring to FIG. 5, the process for detecting presence/absence of periodicity and detecting a period (the process at S4 in FIG. 3) will be described in detail.

CPU 2 binarizes the input image to create a binary image (S22). A process for labeling each region in the binary image is performed (S24). One of the labeled regions is selected that is not subjected to the processes at S28 to S38, which will be described later. It is determined whether or not the size of the selected region is equal to or smaller than a prescribed value (S26). If the size of the selected region is greater than the prescribed value (NO at S26), the process goes back to S26 to select other unprocessed regions, rather than executing the subsequent processes, since a label of a certain size or larger is regarded as associated with a large object and as irrelevant to dots.

Figure 6:
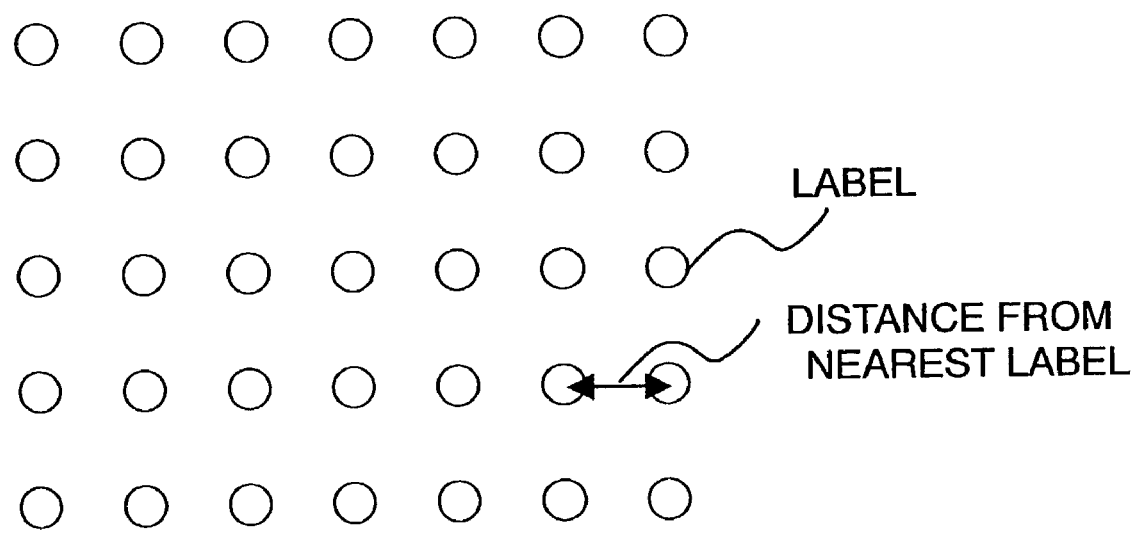
FIG. 6 illustrates the intervals of regions.

If the size of the selected region is equal to or smaller than the prescribed value (YES at S26), it is determined whether or not there are at least a prescribed number of regions that are equally distant from the selected region within a predetermined area including that region, with reference to FIG. 6 (S28). If there are no prescribed or higher number of regions (NO at S28), meaning that the label has no periodicity, the process does not move on and goes back to S26. It is noted that an error may be accepted to a certain degree (approximately two pixels) in determining the equal distance.

Figure 7:
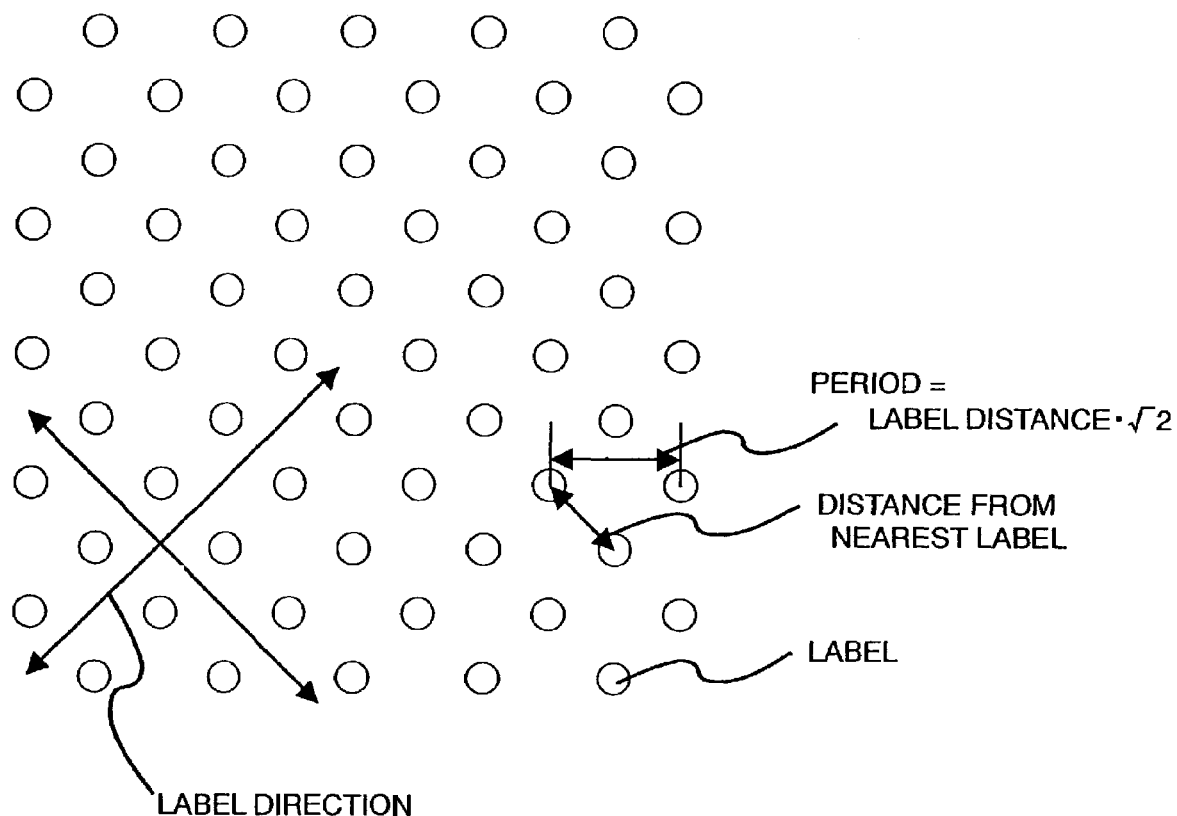
FIG. 7 illustrates an image period in the case where dots are aligned in the direction of 45 degrees.

If there are a predetermined or higher number of such regions (YES at S28), it is determined that the selected region has periodicity. Referring to FIG. 7, if the nearest region is in the direction of 45 degrees (YES at S30), the image period in a predetermined region including the selected region is set by multiplying the interval between regions that was obtained by the process at S28 by 2.5 (S32). Otherwise (NO at S30), the interval between regions obtained by the process at S28 is set as an image period within a prescribed region including that region (S34). In determining the direction of regions, for example, an error of ±22.5 degrees may be allowable. The image period is overwritten into periodicity table 20 (S36).

CPU 2 selects one of unprocessed labels (S38). If there is no unprocessed label (YES at S38), the process is terminated. If there is an unprocessed label (NO at S40), the process from S26 downward is repeated.

It can be determined, in the process shown in FIG. 5, that there is no image period within a prescribed region if the image period is greater than the sampling interval by a certain ratio (for example, three times).

As described above, in the image processing device according to the present embodiment, a smoothing area is set in accordance with an image period, to create a reduced image. In addition, the smoothing area is set to include the same number of dots therein. Thus, when the dot portion is reduced, each pixel has, locally, an approximately equal pixel value. Therefore, a reduced image with suppressed occurrence of moire can be obtained without any deterioration of the image quality. If the smoothing area is 0.5 times the image period, the number of dots included in each smoothing area cannot be equal. This, however, has an effect of preventing an unnatural image due to rapid change at the boundary between a region with a blurred image and a region with a clear image.

Second Embodiment

An image processing device according to the second embodiment of the present invention has a hardware configuration similar to the image processing device of the first embodiment shown in FIG. 1. Therefore, the detailed description thereof will not be repeated here. The second embodiment is to perform, in addition to the processes of the first embodiment, an edge enhancement process for a reduced portion with no periodicity, to prevent deterioration of image quality.

Figure 8:
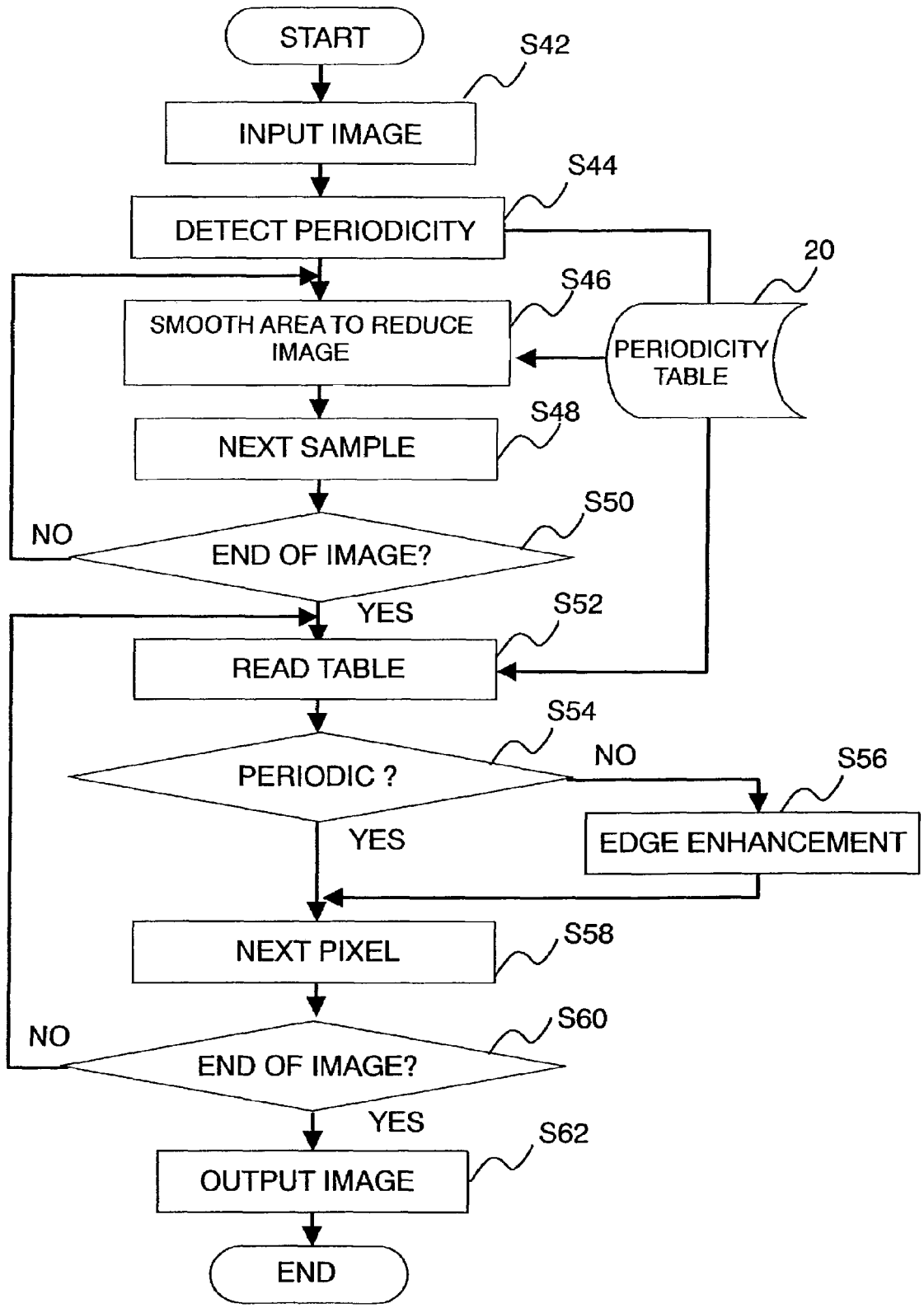
FIG. 8 is a flow chart showing an image reducing process according to the second embodiment.

Referring to FIG. 8, the image reducing process performed by image processing device 12 will be described in detail. At steps S42 to S50, an image input into memory 6 from image scanner 4 or HDD 8 is used to create a reduced image. The processes at S42 to S50 correspond to the processes at S2 to S4, S6, S5 and S8 in FIG. 3, respectively. Therefore, the detailed description thereof will not be repeated here.

When the reduced image is created, CPU 2 extracts one point of the reduced image. The periodicity of a sample point on the input image corresponding to the extracted point is obtained from periodicity table 20 (S52). It is determined whether or not the point has periodicity (S54). If there is no periodicity at that point, an edge enhancement process is provided for the extracted point on the reduced image (S56). The edge enhancement process is a process of obtaining a differential value at that point using a differential filter such as a sobel filter, and adding the differential value to the original pixel value.

After the edge enhancement process, or if it is determined that a corresponding input image has no periodicity at the sample point (YES at S54), an unprocessed pixel is selected from the reduced image (S58). It is determined whether or not the process has been terminated for all the pixels on the reduced image (S60), and if there is an unprocessed pixel (NO at S60), the processes from S52 downward are repeated.

If there is no unprocessed pixel (YES at S60), the reduced image is output to HDD 8 (S62).

As described above, the image processing device according to the present embodiment performs an edge enhancement process for the portion having no periodicity, after the reduced image is created. Therefore, even if a blur occurs at portions other than dots, e.g., character and line-drawing portions, by averaging pixels, the blur can be sharpened. Moreover, the edge enhancement process may be performed on the entire image. Since moire is suppressed at the smoothed dot portion, the edge enhancement will not generate new moire, resulting in a more natural image compared to the case where the edge enhancement is locally performed.

Figure 9:
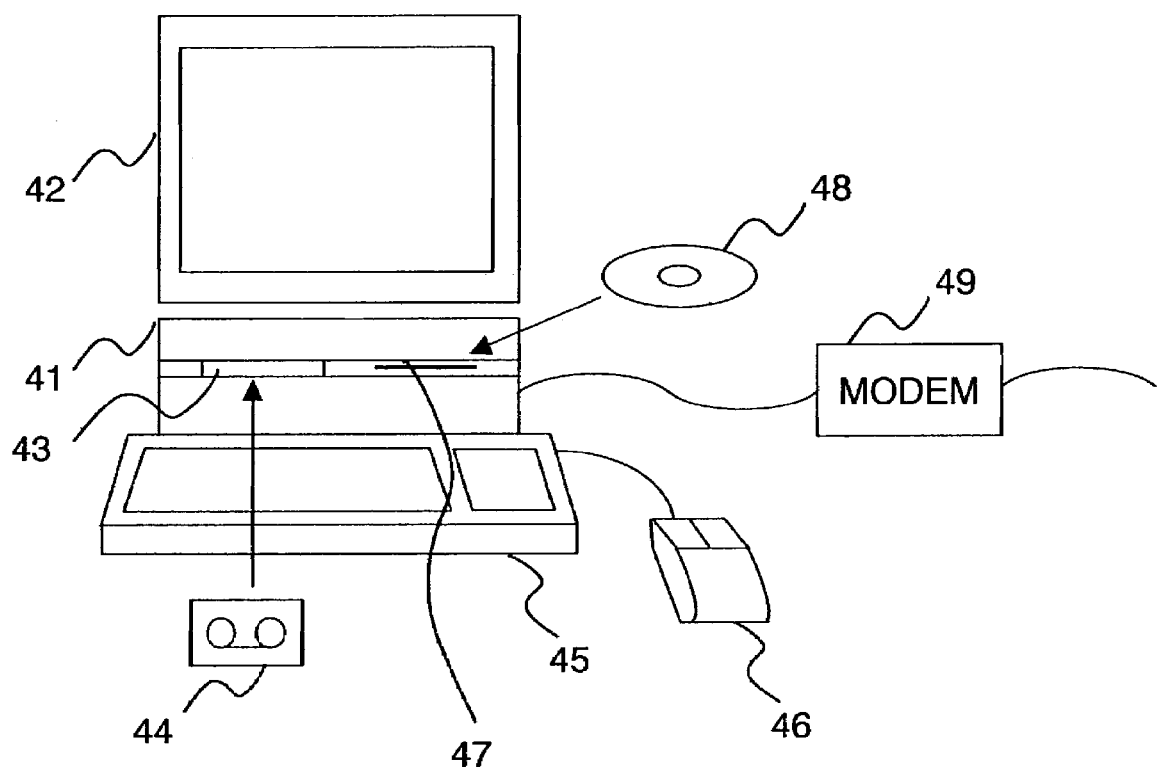
FIG. 9 is an outline view of a computer that implements the image processing device.
Figure 1:
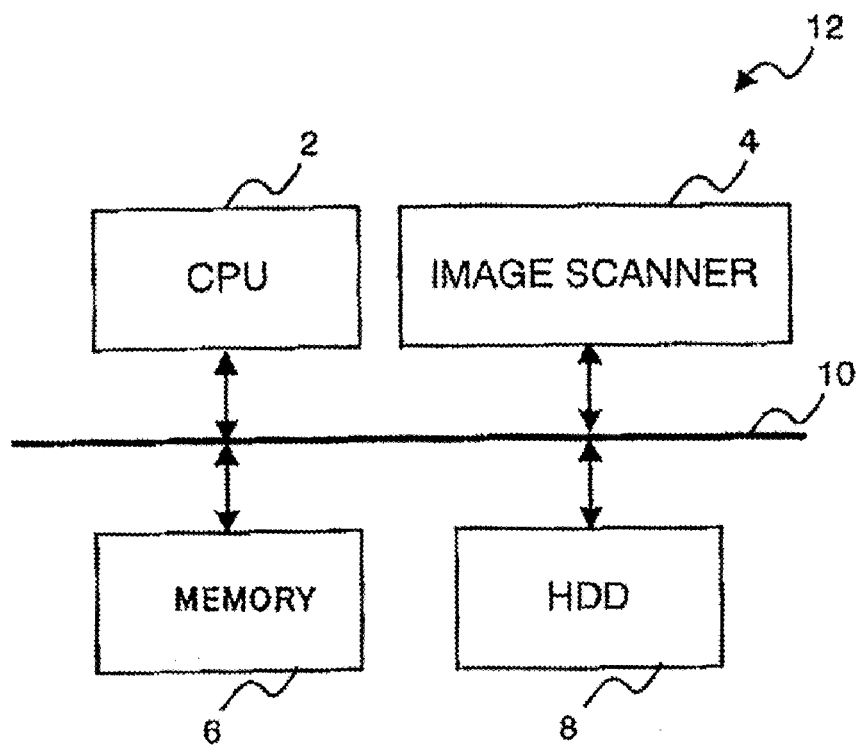
Figure 2:
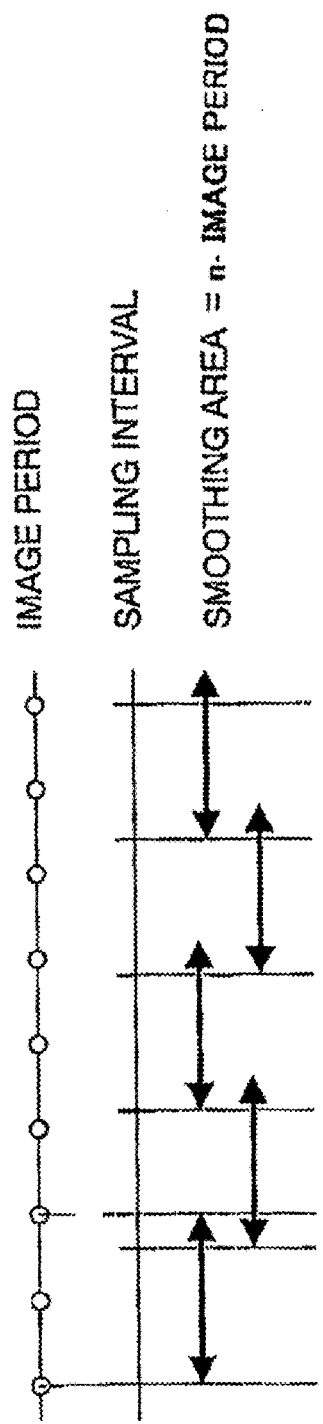
Figure 5:
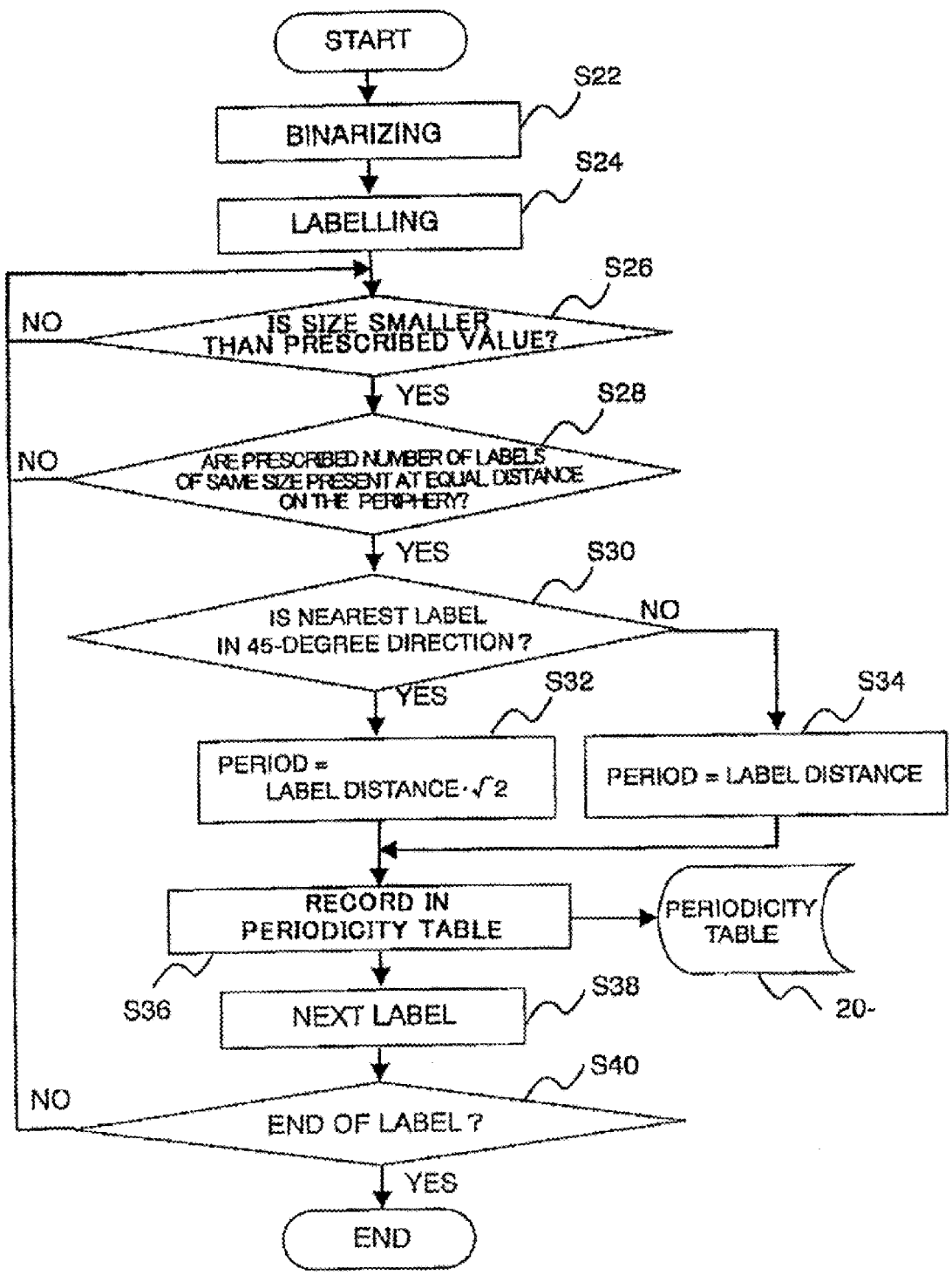
Figure 7:
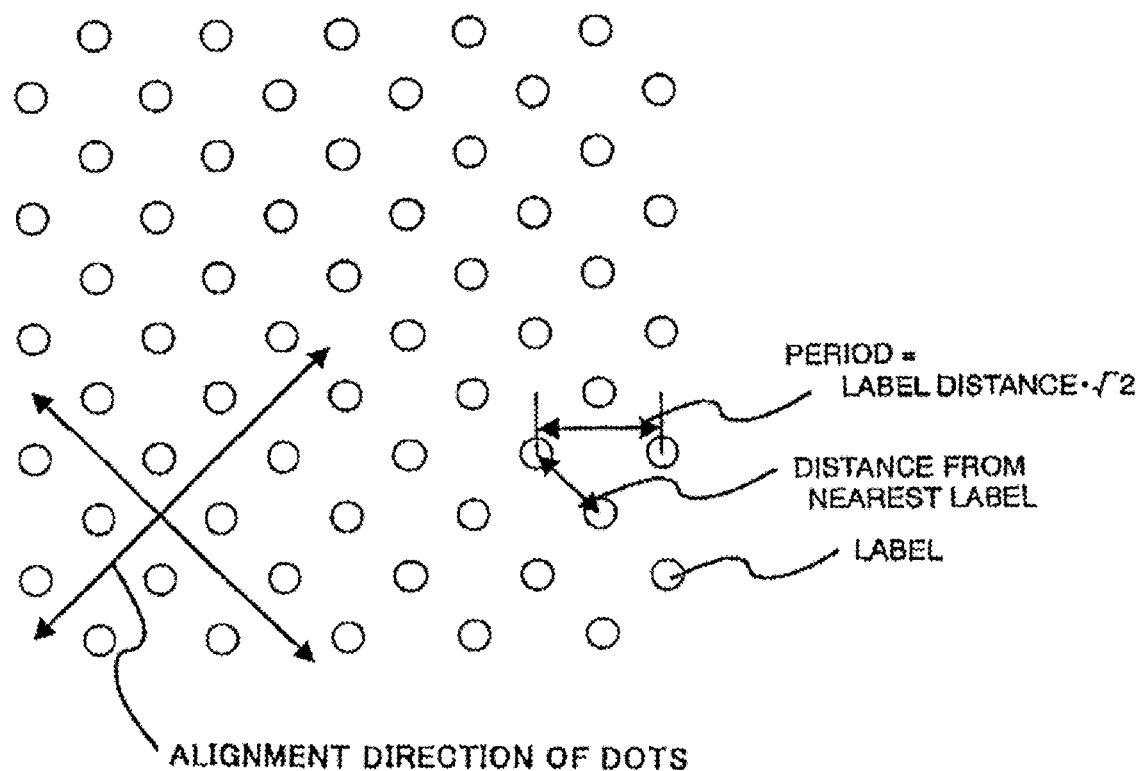
Figure 8:
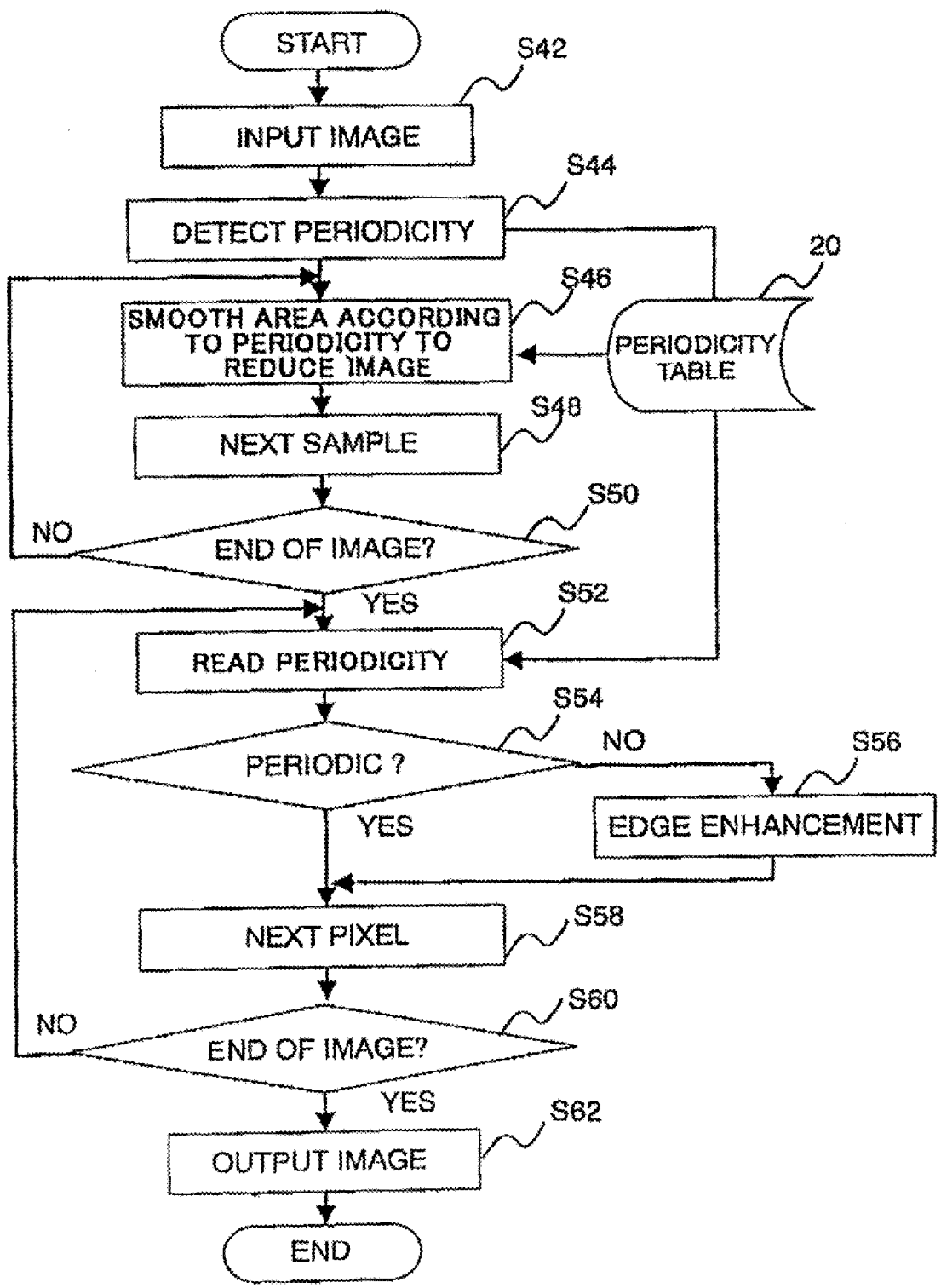

It is noted that image processing device 12 illustrated in the first and second embodiments can be implemented by a computer. Referring to FIG. 9, image processing device 12 includes a computer 41, a keyboard 45 and a mouth 46 for instructing computer 41, a display 42 for displaying a result and the like of an operation performed by computer 41, a magnetic tape device 43 and a CD-ROM (Compact Disc-Read Only Memory) device 47 each for reading a program executed by computer 41, and a communication modem 49.

The program for the image reducing process described with reference to FIGS. 3, 5 and 8 is recorded into magnetic tape 44 or CD-ROM 48 which is a recording medium readable by computer 41, and is read by magnetic tape device 43 or CD-ROM device 47. Alternatively, it is read by communication modem 49 via a communication line.

Figure 10:
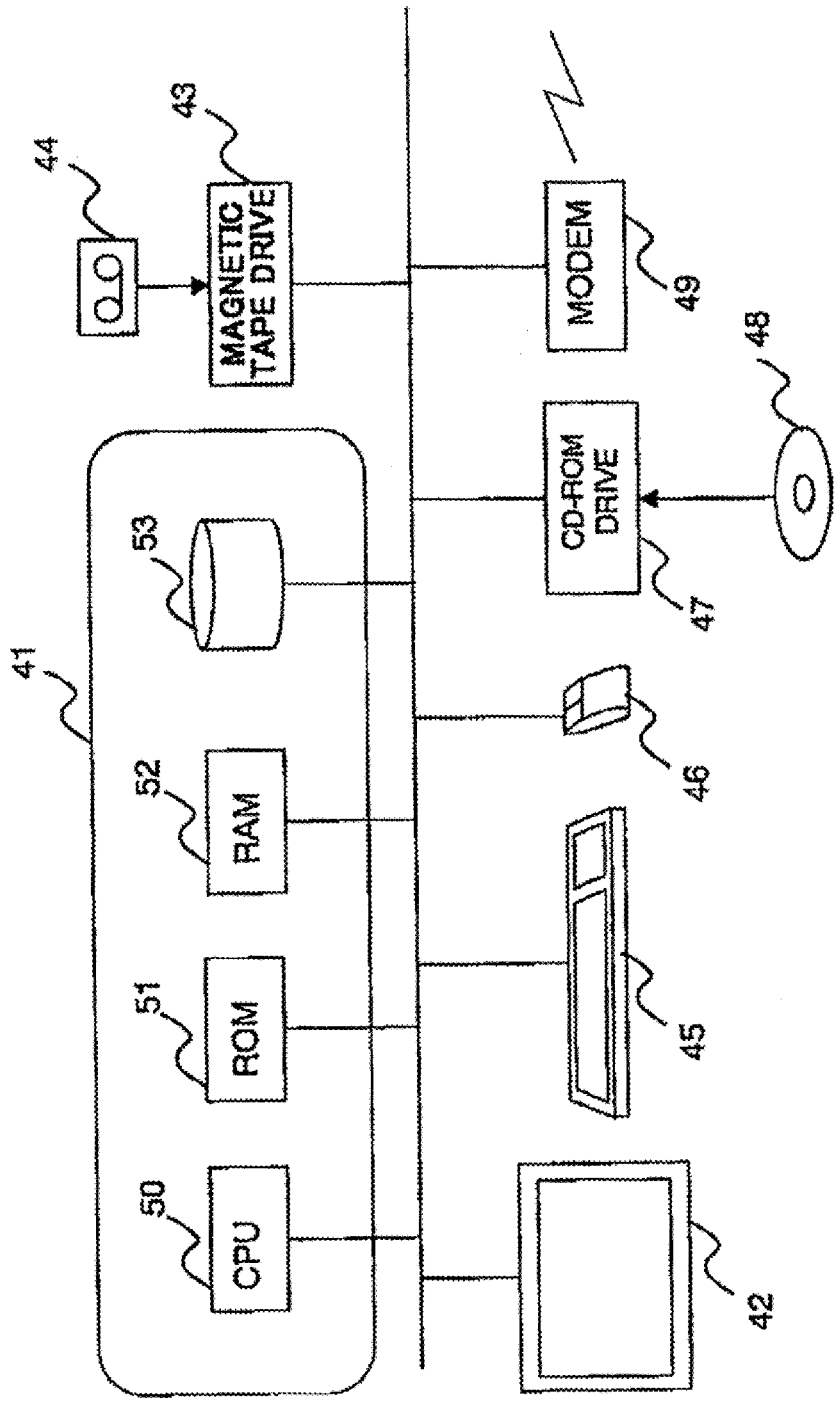
FIG. 10 is a hardware configuration of the computer that implements the image processing device.

Referring to FIG. 10, computer 41 includes a CPU 50 for executing the program read by magnetic tape device 43 or CD-ROM device 47, or via communication modem 49, a ROM (Read Only Memory) 51 for storing the other programs and data required for computer 41 to operate, a RAM (Random Access Memory) 52 for storing a program, a parameter at the execution of the program, an operation result and the like, and a magnetic disk 53 for storing a program, data and the like.

The program read by magnetic tape device 43, CD-ROM device 47 or communication modem 49 is executed by CPU 50 to perform the image reducing process.

INDUSTRIAL APPLICABILITY

As described above, the image processing device and method according to the present invention is suitable for reducing an input image while preventing occurrence of moire, without deterioration of image quality.

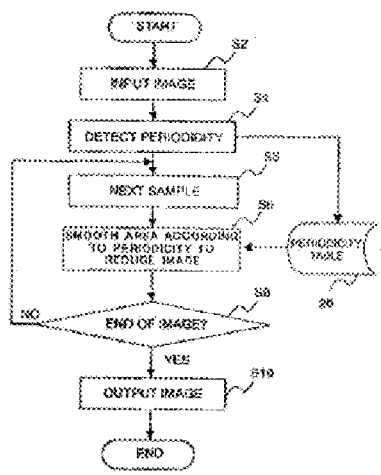

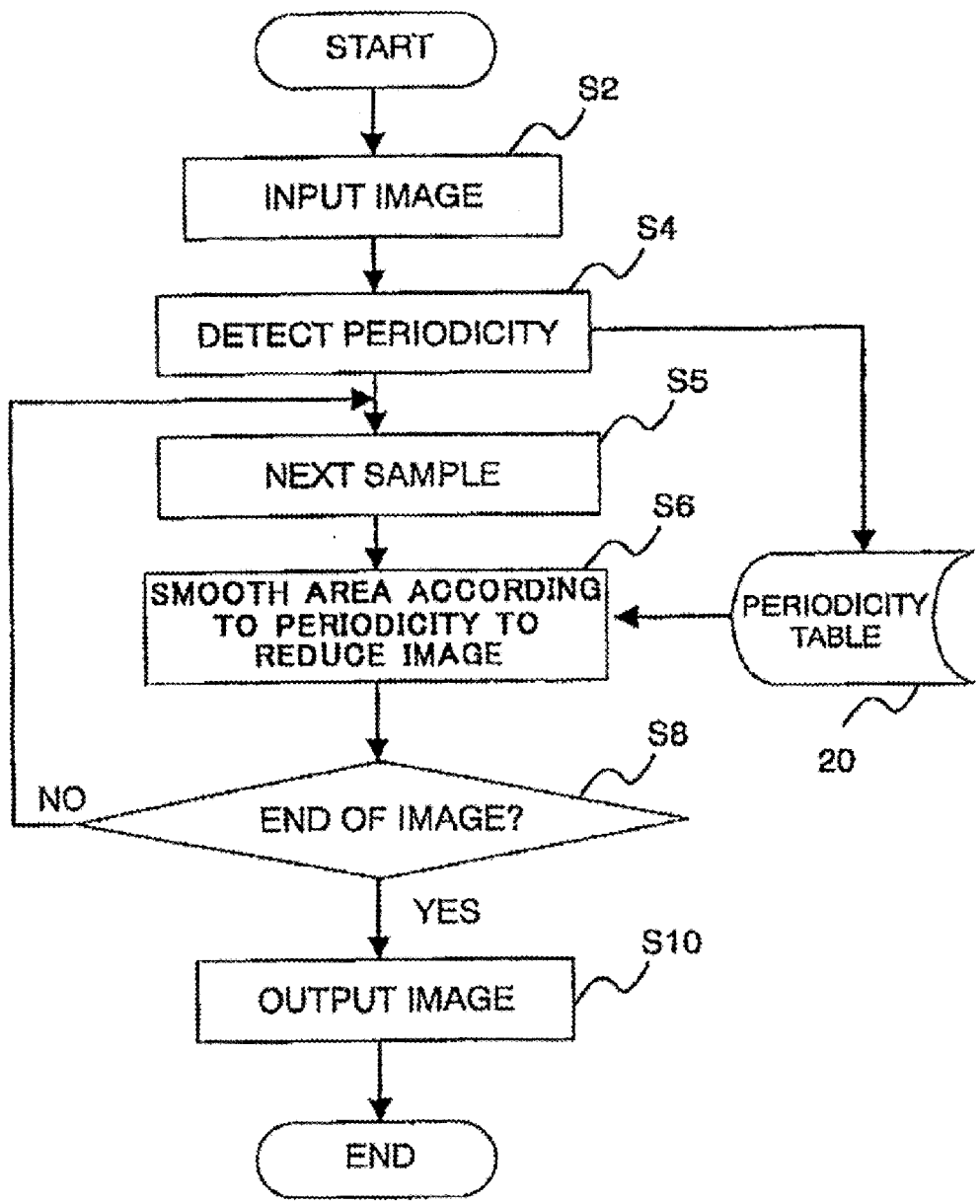

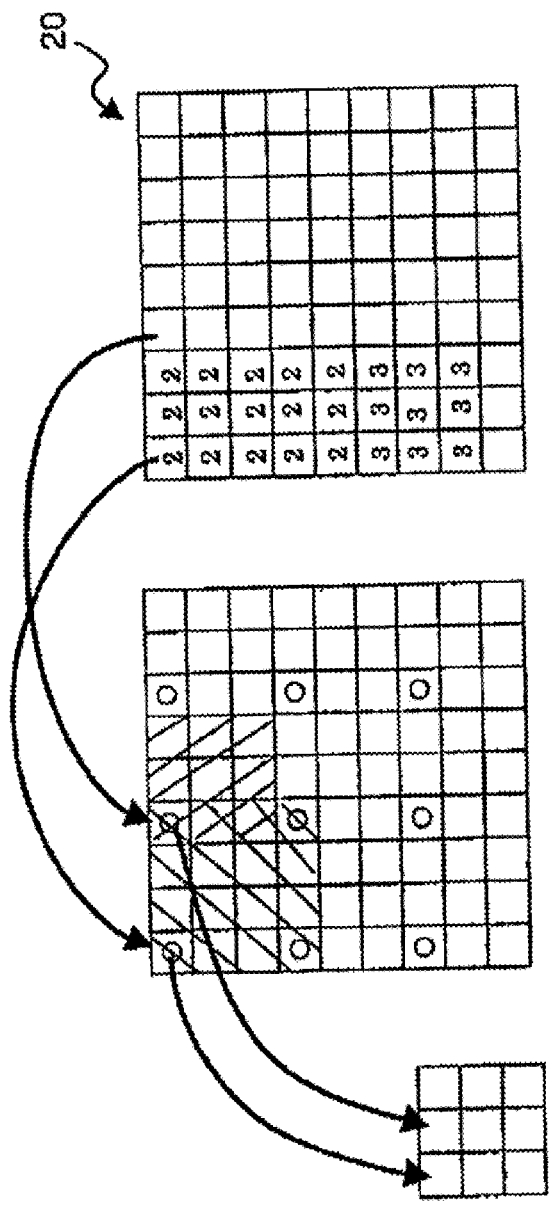

The invention claimed is:

1. An image processing device, comprising:
an image period detecting means (S4) for detecting an image period in an input image; and
an image reducing means (S6, 20) connected to said image period detecting means (S4), for reducing the input image by filtering pixels in an area according to an output of said image period detecting means (S4),
wherein said image period detecting means (S4) includes
a region detecting means (S26) for detecting an image region having a size within a prescribed range in an input image, and
a region interval image period detecting means (S28 to S36) connected to said region detecting means (S26), for detecting an image period based on an interval between said image regions.

2. An image processing device, comprising:
an image period detecting means (S4) for detecting an image period in an input image; and
an image reducing means (S6, 20) connected to said image period detecting means (S4), for reducing the input image by filtering pixels in an area according to an output of said image period detecting means (S4),
wherein said image period detecting means (S4) includes:
a region detecting means (S26) for detecting a region having a size within a prescribed range in an input image, and
a region interval image period detecting means (S28 to S36) connected to said region detecting means (S26), for detecting an image period based on an interval between said regions; and
wherein said region interval image period detecting means (S28 to S36) includes:
a distribution determining means (S28) connected to said region detecting means (S26), for determining, for each region detected by said region detecting means (S26), whether or not at least a prescribed number of said regions are distributed at regular intervals within a prescribed area near the detected region, and
an image period setting means (S30 to S36) connected to said distribution determining means (S28), for setting, when said at least prescribed number of said regions are distributed at regular intervals, the interval in the case of horizontal or vertical distribution, and 2.5 times the interval in the case of 45-degree distribution, as an image period for pixels within a prescribed region including a target region, and for determining, otherwise, that the pixels within the prescribed region including the target region have no periodicity.

3. The image processing device according to claim 2, wherein said region interval image period detecting means (S28 to S36) further includes a means connected to said image period setting means (S28 to S36), for determining that the pixels within said prescribed region including the target region has no periodicity when said image period is greater than said prescribed sampling interval by a certain ratio.

4. The image processing device according to claim 1, wherein said image reducing means (S6, 20) reduces an input image by different methods for pixels with and without periodicity.

5. The image processing device according to claim 1, wherein said image reducing means (S6, 20) selects pixels in an input image at prescribed sampling intervals, finds a value of an integer multiple or a half of an image period greater than said prescribed sampling interval, for each of said selected pixels, and filters pixels around said selected pixels, based on a filter having a size of the found value, to reduce the input image.

6. The image processing device according to claim 1, wherein said image reducing means (S6, 20) selects pixels in an input image at prescribed sampling intervals, and if said selected pixels have no periodicity, filters pixels around said selected pixels based on a filter having a size of said prescribed sampling interval, to reduce the input image.

7. The image processing device according to claim 1, wherein said image reducing means (S6, 20) reduces an input image by different methods for pixels with and without periodicity.

8. The image processing device according to claim 7, further comprising an edge enhancement means (S54, S56) connected to said image reducing means (S6, 20), for performing an edge enhancement process for pixels in a reduced image corresponding to pixels determined to have no periodicity in an input image.

9. The image processing device according to claim 7, wherein said image reducing means (S6, 20) selects pixels in an input image at prescribed sampling intervals, finds a value of an integer multiple or a half of an image period greater than said prescribed sampling interval, for each of said selected pixels, and filters pixels around said selected pixels based on a filter having a size of the found value, to reduce the input image.

10. The image processing device according to claim 7, wherein said image reducing means (S6, 20) selects pixels in an input image at prescribed sampling intervals, and filters, when said selected pixels have no periodicity, pixels around said selected pixels based on a filter having a size of said prescribed sampling interval.

11. The image processing device according to claim 1, wherein said image reducing means (S6, 20) selects pixels in an input image at prescribed sampling intervals, finds a value of an integer multiple or a half of an image period greater than said prescribed sampling interval, for each of said selected pixels, and filters pixels around said selected pixels based on a filter having a size of the found value, to reduce the input image.

12. The image processing device according to claim 11, wherein said image reducing means (S6, 20) selects pixels in an input image at prescribed sampling intervals, and filters, when said selected pixels have no periodicity, pixels around said selected pixels based on a filter having a size of said prescribed sampling interval, to reduce the input image.

13. The image processing device according to claim 1, wherein said image reducing means (S6, 20) selects pixels in an input image at prescribed sampling intervals, and filters, when said selected pixels have no periodicity, pixels around said selected pixels based on a filter having a size of said prescribed sampling interval.

14. An image processing method used in an image processing device including an image period detecting means for detecting an image period for pixels in an input image, and an image reducing means connected to said image period detecting means, for reducing the input image by filtering pixels in an area according to an output of said image period detecting means, comprising the steps of:
detecting (S4) a local image period of pixels in the input image;
selecting (S5) pixels in the input image at prescribed sampling intervals; and
reducing (S6) the input image by filtering, for each of said selected pixels, pixels in the area according to said image period on the periphery of the selected pixels.

15. An image processing method used in an image processing device including an image period detecting means for detecting an image period for pixels in an input image, and an image reducing means connected to said image period detecting means, for reducing the input image by filtering pixels in an area according to an output of said image period detecting means, comprising the steps of:
detecting (S4) a local image period of pixels in the input image;
selecting (S5) pixels in the input image at prescribed sampling intervals; and
reducing (S6) the input image by filtering, for each of said selected pixels, pixels in the area according to said image period on the periphery of the selected pixels,
wherein said step of reducing an input image (S5) includes the step of reducing the input image by selecting pixels in the input image at prescribed sampling intervals, finding a value of an integer multiple or a half of an image period greater than said prescribed sampling interval for each of said selected pixels, and filtering pixels around said selected pixels based on a filter having a size of the found value.

16. An image processing method used in an image processing device including an image period detecting means for detecting an image period for pixels in an input image, and an image reducing means connected to said image period detecting means, for reducing the input image by filtering pixels in an area according to an output of said image period detecting means, comprising the steps of:

detecting (S4) a local image period of pixels in the input image;

selecting (S5) pixels in the input image at prescribed sampling intervals; and reducing (S6) the input image by filtering, for each of said selected pixels, pixels in the area according to said image period on the periphery of the selected pixels, wherein said step of detecting an image period (S4) includes the steps of detecting (S26) an image region having a size within a prescribed range in an input image, and detecting (S28 to S36) an image period based on an interval between said image regions.

17. The image processing method according to claim 16, wherein said step of detecting an image period (S28 to S36) includes the steps of determining (S28), for each image region detected by said step of detecting an image region (S26), whether or not at least a prescribed number of said image regions are distributed at regular intervals within a prescribed area near the detected image region, and setting (S20 to S36), when said at least prescribed number of said image regions are distributed at regular intervals, the interval in the case of horizontal or vertical distribution, and 2.5 times the interval in the case of 45-degree distribution, as an image period for pixels within a prescribed area including a target region, and otherwise determining that the pixels within the prescribed image region including the target region have no periodicity.

18. An image processing device, comprising:

an image period detecting means (S4) for detecting an image period in an input image; and an image reading means (S5, S6, 20) connected to said image period detecting means (S4), selecting pixels in the input image at prescribed sampling intervals and for reducing the input image by filtering each or a plurality of pixels in an appropriate area for each of said selected pixels in accordance with an output of said image period detecting means (S4).

* * * * *

UNITED STATES PATENT AND TRADEMARK OFFICE
CERTIFICATE OF CORRECTION

| | | |
|---|---|---|
| PATENT NO. | : 7,373,015 B2 | |
| APPLICATION NO. | : 10/149486 | |
| DATED | : May 13, 2008 | |
| INVENTOR(S) | : Kazuyuki Nako | |

It is certified that error appears in the above-identified patent and that said Letters Patent is hereby corrected as shown below:

Delete the title page and substitute therefore the attached title page consisting of corrected illustrative figure.

Delete Drawing Sheets 1-5, 7, 8, and 10 and substitute therefore the attached Drawing Sheets 1-5, 7, 8, and 10.

Signed and Sealed this

Tenth Day of March, 2009

JOHN DOLL
*Acting Director of the United States Patent and Trademark Office*

(12) United States Patent
Nako

(10) Patent No.: US 7,373,015 B2
(45) Date of Patent: May 13, 2008

(54) IMAGE PROCESSING DEVICE AND METHOD

(75) Inventor: Kazuyuki Nako, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 628 days.

(21) Appl. No.: 10/149,486

(22) PCT Filed: Dec. 11, 2000

(86) PCT No.: PCT/JP00/08772

§ 371 (c)(1),
(2), (4) Date: Oct. 15, 2002

(87) PCT Pub. No.: WO01/45041

PCT Pub. Date: Jun. 21, 2001

(65) Prior Publication Data

US 2003/0118247 A1    Jun. 26, 2003

(30) Foreign Application Priority Data

Dec. 15, 1999 (JP) .................... 11/355627

(51) Int. Cl.
*G06K 9/40* (2006.01)
(52) U.S. Cl. ............... 382/275; 382/260; 382/274; 382/275; 382/282; 358/3.26; 358/3.27; 358/463
(58) Field of Classification Search ........... 382/260, 382/266, 274, 275, 282, 294, 298; 385/3.26, 385/3.27, 463, 1.2
See application file for complete search history.

(56) References Cited

U.S. PATENT DOCUMENTS

| | | | | |
|---|---|---|---|---|
| 4,969,051 A | * | 11/1990 | Sasaki | 358/447 |
| 5,121,445 A | * | 6/1992 | Tsujiuchi et al. | 382/280 |
| 5,173,788 A | * | 12/1992 | Ohta | 382/264 |
| 5,225,915 A | * | 7/1993 | Ciccone et al. | 358/447 |
| 5,513,016 A | | 4/1996 | Inoue | 358/456 |
| 5,526,446 A | * | 6/1996 | Adelson et al. | 382/275 |
| 5,541,740 A | * | 7/1996 | Mori | 358/447 |
| 5,649,031 A | * | 7/1997 | Nakamura et al. | 382/254 |
| 5,821,915 A | * | 10/1998 | Graham et al. | 345/615 |

(Continued)

FOREIGN PATENT DOCUMENTS

JP    62-088478    4/1987

(Continued)

*Primary Examiner*—Yosef Kassa
(74) *Attorney, Agent, or Firm*—George W. Neuner; David G. Conlin; Edwards Angell Palmer & Dodge, LLP

(57) ABSTRACT

In an image processing method for reducing an input image while preventing moire without deterioration of image quality, presence/absence of periodicity is detected for each pixel on the input image, and if there is periodicity, an image period is detected (S4). Sample points are sequentially extracted from the input image at prescribed sampling intervals (S5). A value is obtained by multiplying the image period by n (n is a natural number) that exceeds the sampling interval, to set a smoothing area. Pixels around a sample point is smoothed in the set smoothing area. The pixel value for a reduced image is obtained (S6). If there is an unprocessed sample point (NO at S8), the step goes back to S6, and the next sample point is subjected to a similar process. If the process is terminated for all the sample points (YES at S8), the reduced image is output.

18 Claims, 10 Drawing Sheets